T. F. HORAN.
FIREARM.
APPLICATION FILED JULY 12, 1915.
1,242,191.
Patented Oct. 9, 1917.
3 SHEETS—SHEET 1.
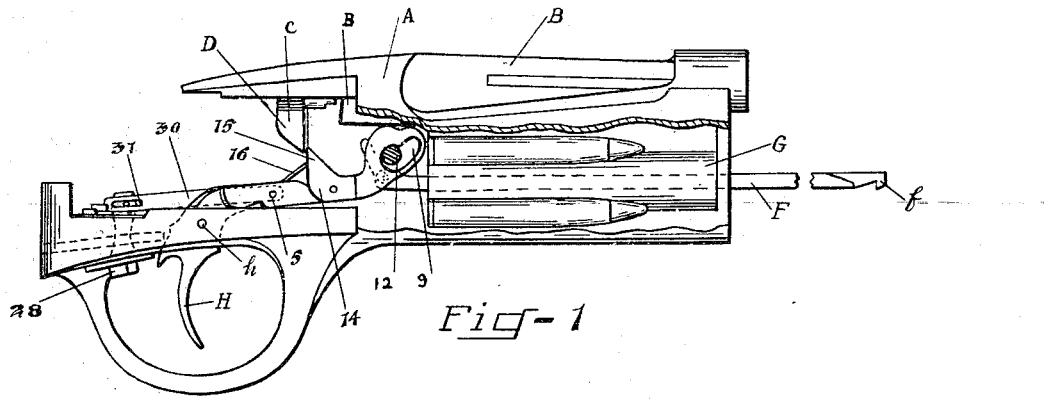
Fig-1
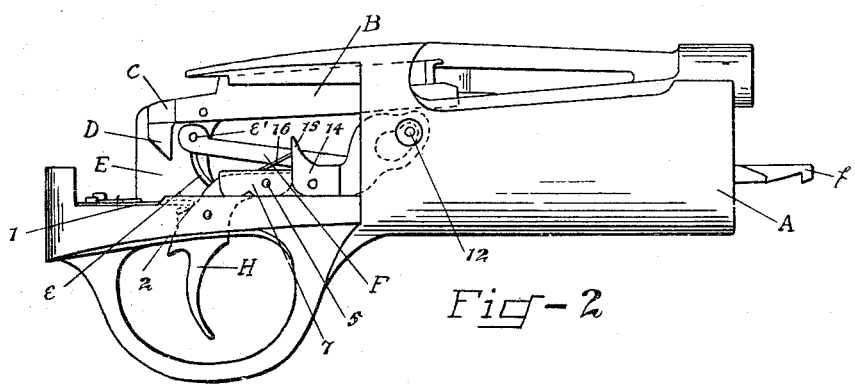
Fig-2
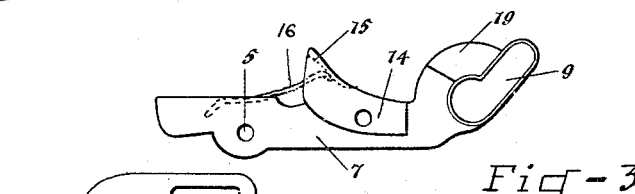
Fig-3
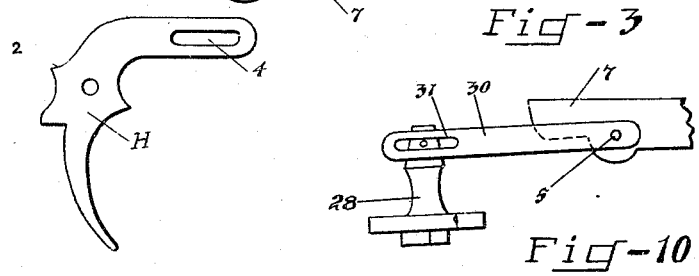
Fig-10
Fig-4
WITNESSES:
S. C. Hooke
Harriet Williams
INVENTOR
Timothy F. Horan
BY Martin & Jones
ATTORNEYS

T. F. HORAN.
FIREARM.
APPLICATION FILED JULY 12, 1915.

1,242,191.

Patented Oct. 9, 1917.
3 SHEETS—SHEET 2.

WITNESSES:
S. E. Hooke.
Harriet Williams

INVENTOR
Timothy F. Horan
BY Martin & Jones

ATTORNEYS

T. F. HORAN.
FIREARM.
APPLICATION FILED JULY 12, 1915.
1,242,191.
Patented Oct. 9, 1917.
3 SHEETS—SHEET 3.
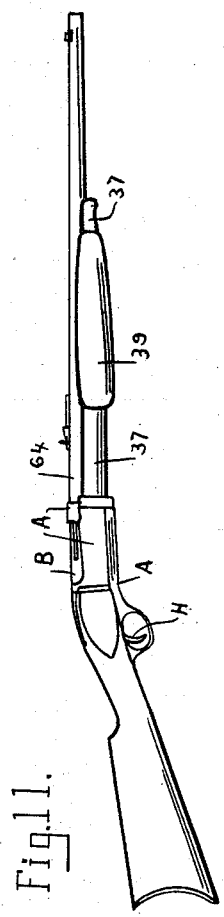
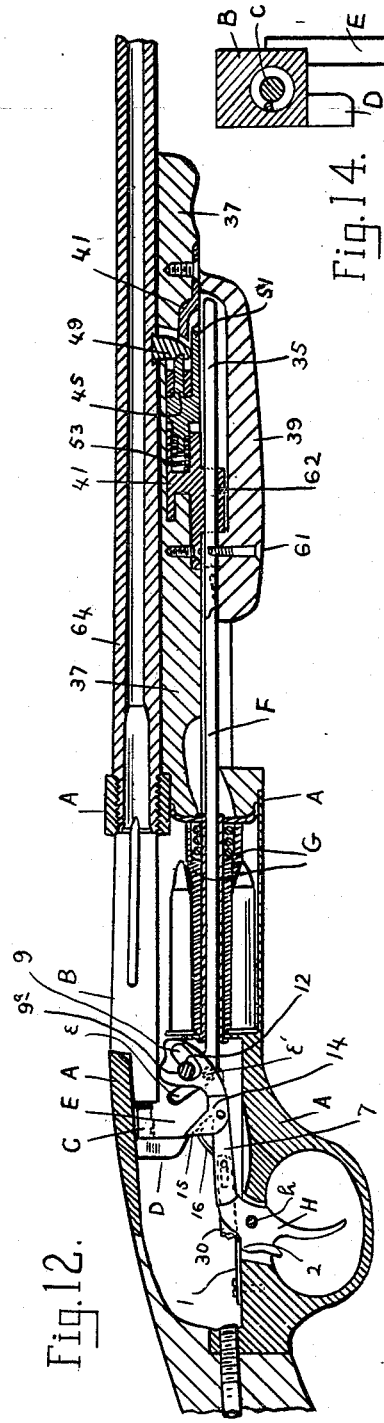
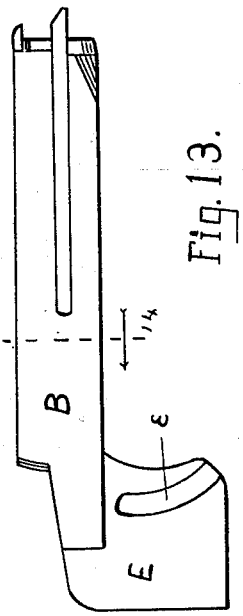
INVENTOR
Timothy F. Horan
BY Martin & Jones
ATTORNEYS

UNITED STATES PATENT OFFICE.

TIMOTHY F. HORAN, OF ILION, NEW YORK.

FIREARM.

1,242,191.   Specification of Letters Patent.   Patented Oct. 9, 1917.

Application filed July 12, 1915. Serial No. 39,266.

*To all whom it may concern:*

Be it known that I, TIMOTHY F. HORAN, of Ilion, in the county of Herkimer and State of New York, have invented certain new and useful Improvements in Firearms; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My invention relates to an improved firearm.

The invention is shown as applied to a modern high-power rifle having a rotary magazine and a breech-block sliding to and fro by mechanism which operates at the same time to place a cartridge and to cock the rifle ready for firing. The invention is particularly applied to and is exhibited in connection with a rifle having a pump-action by the operation of which the loading and firing mechanisms are positioned and the empty shells extracted.

One purpose of my present invention is to provide a pump-action magazine firearm having a fore-end take-down, by which expression is meant the feature of having the barrel and forestock and sliding member on the forestock readily detachable from the frame and its contained mechanism and pumping-rod in order to place the firearm in more compact form as for carrying, transportation or storage.

Another object of my invention is to provide a pump-action firearm wherein the pumping-rod passes from the forestock to the frame-contained mechanism operated thereby, through a central opening in the rotary magazine, thereby obtaining greater strength and simplicity of construction and more direct and efficient operation.

A still further purpose is to provide novel and improved means for locking the breech-block of a firearm in forward and upward or closed position and also in combination therewith to provide improved means for releasing such a locking device without pulling the trigger.

Further purposes and advantages of my invention will appear from the specification and claims herein.

Figure 5:
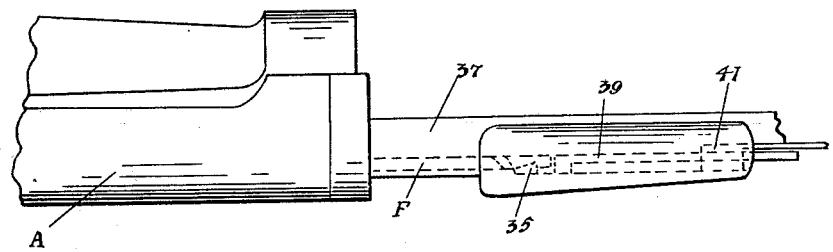
Figure 6:
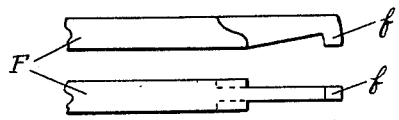
Figure 7:
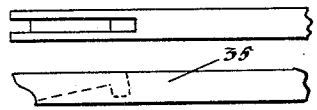
Figure 8:
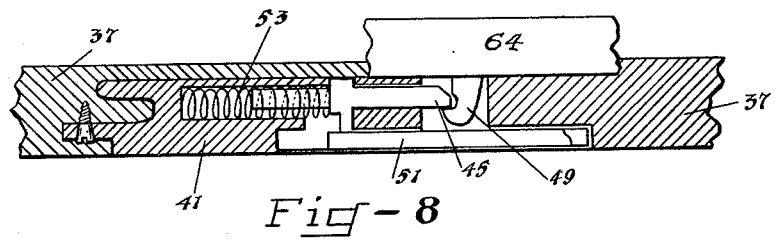
Figure 9:
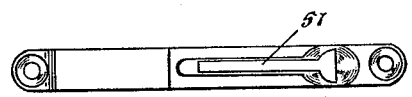

In the drawings Figure 1 is a side view of the parts of the device, showing the parts in position for firing, a portion of the case being broken away; Fig. 2 is a like view with the parts in retracted position; Fig. 3 is a detail view of a portion of the mechanism shown in Figs. 1 and 2; Fig. 4 is a like view of another part; Fig. 5 is a view showing the forestock of the rifle with the pump-handle and showing in dotted lines the connection of the pump-handle and its parts with the operating or pumping-rod; Fig. 6 is a detail view of such last-mentioned part and Fig. 7 is a broken plan and a side elevation of the fore-bar into which the operating rod or stem fits. Fig. 8 is a section of a part of the forestock showing means by which it is secured to the barrel of the rifle. Fig. 9 is a view, from below, of some of the parts shown in Fig. 8. Fig. 10 shows the safety and unlocking device. Fig. 11 is a side view on a small scale of a firearm embodying my invention. Fig. 12 is a central longitudinal section on an enlarged scale through the firearm with the forward part of the barrel and the rear part of the stock removed. Fig. 13 is a side elevation of the breech-block seen from the same side as viewed in Fig. 12, but on a still larger scale. Fig. 14 is a cross-sectional view on line 14—14 of Fig. 13, but showing the firing-pin and firing-pin spring within the breech-block.

Referring to the drawings in detail, A represents the frame, B shows the breech-block having a firing-pin C spring mounted therein, with the dog D adapted in the operation of the mechanism to place the firing-pin under tension by means of its engagement with the sear 14 which holds it in retracted position until the trigger H is pulled.

Integral with or secured to the breech-block B is a rearwardly and downwardly extending side-plate E which has a curved groove *e* therein, in which travels a laterally extending pin *e'* mounted on the rear end of the pumping-rod F, which rod travels to and fro through the axial center of the magazine G which carries the cartridges.

At H is shown the trigger pivoted in the frame A at *h* and held in normal position by the spring 1 which bears in a shoulder 2 on the trigger H. The trigger extends forwardly and is toward its forward end provided with a slot 4 through which the screw 5 passes and sets into a locking block 7, allowing longitudinal movement of the block relative to the trigger and pivotal action of both trigger and block 7 at the point where connected by the screw 5. The block 7 extends forwardly and has at its forward end a slot 9 disposed diagonally, slanting upwardly as it extends forwardly and which as illustrated travels on the screw 12 mounted transversely of the frame A. The block 7 may be provided to travel on any other convenient portion of the mechanism.

About midway of the block 7 is provided a sear 14 at the rear end of which is an upright extension 15, the sear being conveniently mounted astraddle of said block 7 and normally held with the extension upright by means of a spring 16. The block 7 has on its upper side near its front end a portion 19 preferably thickened by projecting from the face opposite to that shown in Fig. 3. This thickened portion or boss 19, when the rifle is cocked, is forced into place between the screw 12 or other stationary portion of the mechanism and the lower side of the breech-block B and holds the breech-block up in locked position.

Assuming the rifle to be in loaded or locked position and cocked as shown in Fig. 1, the pulling of the trigger lowers the sear 14 on the block 7 so as to bring the extension 15 below contacting position with the firing-pin, which is then released and the cartridge fired. The necessary lowering of the sear 14 is accomplished through the pulling of the trigger H lowering its forward end and so lowering the rear end of the block 7 upon which is the sear 14. The block 7 is able to move downward at its rear end by a swinging or pivotal motion of said block upon the screw 12 at its forward end. It will be noticed that the upper edge of the thickened locking portion 19 of block 7 is rounded or curved on a circle having its center at the axis of screw 12 so that while the locking portion 19 when in forward or locking position, locks the breech-block B in upper or firing position, yet the block 7 is free to make the slight swinging motion necessary to lower the sear from the dog D of the firing-pin C.

The pumping rod F has its rearward end to the rear of the magazine G and is there connected to the breech-block B by the laterally extending pin e' resting in the curved groove e of the side plate E of the breech-block as heretofore mentioned. The pumping rod F then extends forward through an opening provided in the axial center of the magazine G and is slidingly mounted in said opening. Said rod F also slidingly extends forward through an opening in the rear end of the forestock 37 where said rear end of the forestock is set into the forward end of the frame A, and then farther forward through a downwardly opening slot in said forestock. The pumping rod has a hooked forward end f detachably engaging the hooked rearward end of the fore-bar 35. This fore-bar is located in an upwardly opening slot in the pump handle 39 and is secured thereto by a screw 61 while the fore-bar is slidingly mounted in a socket 62, downwardly extending from a block or metal member 41 set into the forestock 37.

The forestock 37 is grooved on its upper side to fit the lower side of the barrel 64 and is detachably connected thereto by a sliding dog or catch 45 mounted in the block 41 and normally forced forward by a spring 53 and adapted to be forced back by the finger slide 51 which is integral with or rigidly connected to said catch 45 and which is located flush with the lower surface of the block 41 and forestock 37. The catch 45 engages the hooked rearward side of a lug 49 extending down from the lower side of the barrel 64 through an opening in the forestock 37. The rear end of the forestock fits into a socket in the front end of the frame A. It will thus be seen that as soon as the forestock is pressed to the barrel it will be held rigidly in place until the catch 45 is released.

Assuming the rifle to have its mechanism in forward or loaded position and cocked, pulling the trigger not only disengages the sear from the dog D of the firing pin and lets the firing pin drive forward and fire the rifle, but also operates to unlock the breech-block B, in that as soon as the sear is disengaged from the dog D, the locking block 7, upon which is mounted the sear, is also released from the forward tension of dog D and is free to fall back and down from its forward and raised position of engagement with the breech-block B. The block 7 does thus move as soon as the trigger is released and goes back to normal position, for the reason that the upward movement of the rear end of the block 7 caused by the upward movement of the front end of the trigger, swings the forward end of the block upon the upper surface of the boss 19 rather than upon the screw 12 and so acts to start the block back at the point where the screw 12 rests in the relatively level rearward upper part 9ª of slot 9, and leaves the block with the inclined upper surface of slot 9 resting on screw 12. From this position the block usually falls by gravity to lowered and retracted position or is readily moved to that position as soon as backward and downward movement is imparted to the breech-block as hereinafter described.

The operator by grasping the pump handle 39 and moving it backward will force the pump rod F back so that the lateral pin e' at the rear end of said pump rod F riding in the groove e will then with a camming action force the rear end of the breech-block down until its rear end clears the adjacent shoulder of the frame; then the pin having come to the upper and rear end of the groove e will continue to force the breech-block back until it is in retracted position and the cartridge if any is withdrawn from the barrel 64 and thrown out by proper means not relevant to this invention and a new cartridge is received from the magazine G. As the breech-block has passed back, the firing-pin dog D has ridden over and passed the sear by temporarily depressing the upward extension 15 of said sear 14, if the trigger has been pulled. If the trigger has not been pulled the dog D would still be in the rear of the sear in the relative position shown in Fig. 1, but with dog D of the firing-pin, the breech-block B and the locking block 7 farther to the rear in the frame A. Also the rear end of the pumping rod F will extend much farther out from the rear end of the cartridge magazine and the pump handle 39 will be back almost to the frame A, or in other words almost to the rear enlargement on the forestock 37 provided to fit the socket in the front end of the frame A.

From this rearward or retracted position of the mechanism shown in Fig. 2, forward movement of the pump handle 39 draws the pumping rod F forward and the pin e' at the rear end of the pumping rod F engaging the forward side of groove e on the side-plate E of the breech-block B draws the breech-block forward until the cartridge grasped by the breech-block is well into the barrel 64 and the forward end of the breech-block is within say ⅛ of an inch of the rear end of the barrel; then the rear end of the breech-block has cleared the overhanging portion of the frame and is free to move up and slightly forward into firing position. This upward movement of the rear end of the breech-block and slight final forward movement of the breech-block is produced by the camming action of the pin e' in the downwardly and forwardly inclined groove e as the pumping rod F is given a further forward movement.

As the breech-block has thus moved forward the downwardly extending dog D of the firing-pin C has moved forward with the breech-block until the dog has reached the upward extension 15 of sear 14 which is in the path of said dog. As the locking block 7 to which the sear is secured is not yet free to move forwardly and upwardly, the sear 14 by the engagement of its upward extension 15 arrests the forward movement of said dog D and firing-pin C, while the breech-block continues its forward course, thereby operating to place the firing-pin spring under compression and the firing-pin under tension to move forward.

As soon as the rear end of the breech-block has been moved up to closed position, the locking block is free to slide forwardly and its forward end upwardly and such movement takes place under the forward tension of the dog D communicated to sear extension 15, resulting in the thickened portion or boss 19 being forced between the lower surface of the breech-block and the transverse screw 12, thus securely locking the breech-block in forward position and the rifle is cocked. Whether fired or to be unloaded without firing, the parts are moved to retracted position by another backward movement of the pump handle 39 and again moved to forward or firing position by another forward movement of said handle as described above.

It will be understood that various devices may be used, as are familiar, to lock the trigger in safety position. At 28, in Fig. 1, is shown a safety-lock which is mounted in the frame to slide to and fro. In its extreme forward position it engages the rear edge of the trigger and locks the rifle from firing. When moved from its forward position to middle position the trigger only is released. When the safety-lock is moved to extreme rearward position it draws back the link 30, which is slotted, at 31, where connected with safety-lock 28. The forward end of link 30 is pivoted to block 7 as by being mounted on screw 5, which connects the trigger H to the locking block 7. The retraction of the safety-lock to extreme rearward position draws back the block 7 and unlocks the breech-block, permitting it to assume the lower position, to clear the frame and allowing the action of the forestock mechanism to press the breech-block backward into the position shown in Fig. 2 and thus allow a cartridge to be removed and the rifle to be unloaded. The slot 31 in link 30 is so located that the pin projecting thereinto from the post of the sliding safety-lock, slides from the front end of the slot to the rear end of the slot when the safety-lock is moved rearward to release the trigger and so does not operate the link until the second step rearward of the safety-lock, so that releasing the trigger does not unlock the breech-block. This manipulation of the locking block 7 is used when it is desired to open the breech without firing the gun or pulling the trigger.

The forestock 37, fore-bar 35 and pump-handle 39 while still together may be detached from the barrel 64 and frame A, by moving the pump-handle nearly to retracted or rearward position, thus uncovering the finger slide 51, then moving said finger slide rearward, thus withdrawing the catch 45 from the hooked lug 49, then swinging the forward end of the forestock away from the barrel, thus unhooking the hooked end f of the pump-rod from the adjacent or rear end of the fore-bar 35 and then drawing the forestock forward until its rearward end is out of the socket in the front end of the frame A and away from the pumping-rod F. The three parts thus removed may be entirely separated, by removing screw 61, thus allowing the pump-handle 39 to be taken from the other two parts and in turn allowing the fore-bar 35 to be entirely removed from the socket 62 by sliding endwise therefrom.

These parts are readily assembled again by reversing the foregoing operations in an obvious manner, care being taken to have the pump-handle well back on the forestock when the hooked forward end f of the pump-rod F is thrust through the rear opening in the forestock to be hooked into the rear end of the fore-bar 35. It will be noticed that the joint between the pump-rod F and fore-bar 35 is of such construction as shown in the drawings, that it will communicate motion without becoming disconnected when the parts are in a straight line and can be disconnected only by swinging the fore-bar out from the forestock as above described.

What I claim as new and desire to secure by Letters Patent is:

1. The combination in a firearm, of a frame, a barrel secured thereto, a rotating cartridge magazine in the frame having an opening through its axial center, mechanism in the frame for placing a cartridge in the barrel, closing the breech, cocking the arm, opening the breech and taking the cartridge from the barrel, and a member mounted to slide back and forth through said axial opening in the magazine and operated from its forward end beyond the magazine and connected at its rear end to the said mechanism in the frame whereby movement of said sliding member back and forth operates said mechanism in the frame.

2. The combination in a firearm, of a frame, a barrel secured thereto, a rotating cartridge magazine in the frame having an opening through its axial center, mechanism in the frame for placing a cartridge in the barrel, closing the breech, cocking the arm, opening the breech and taking the cartridge from the barrel, a forestock forward of the frame and secured to the barrel, a handle mounted to slide back and forth on the forestock and a connecting member extending from the sliding handle on the forestock through the axial opening of the magazine to the mechanism in the frame whereby movement of the sliding handle back and forth operates said mechanism in the frame.

3. The combination in a pump-action firearm, of a frame, a barrel secured thereto, a rotary cartridge magazine in the frame having an opening through its axial center, a breech-block mounted in the frame to move up and forward to closed position, and down and back to retracted position, mechanism operatively connected to said breech-block for carrying a cartridge forward into the barrel and cocking the firearm as the breech-block goes forward and for removing the cartridge from the barrel as the breech-block moves back, a pumping rod operatively connected at its rear end to said breech-block and slidingly mounted in the axial opening of the magazine and operated with a back-and-forth motion from its front end beyond said magazine whereby movement of said pump rod operates the breech-block and its connected mechanism.

4. In a pump-action magazine firearm, the combination of a frame, a barrel detachably secured thereto, a forestock having its rear end detachably connected to the forward end of the frame and detachably secured at its forward end to the barrel whereby its forward end may be swung away from the barrel, a magazine in the frame, mechanism in the frame for placing a cartridge in the barrel, closing the breech, cocking the arm, opening the breech and taking the cartridge from the barrel, a member slidingly mounted on the forestock and a pumping rod connected at its forward end to said sliding member by a joint that is rigid when the rod and sliding member are in line but detachable when the sliding member is turned at an angle by the forward end of the forestock being swung away from the barrel, the rear of said pumping rod being operatively connected to said mechanism in the frame whereby forward and backward movement of the sliding member on the forestock operates said mechanism in the frame.

5. In a pump-action magazine firearm, the combination of a frame, a barrel detachably secured thereto, a forestock having its rear end removably inserted in the forward end of the frame and detachably secured at its forward end to the barrel whereby its forward end may be swung away from the barrel, a magazine in the frame, mechanism in the frame for placing a cartridge in the barrel, closing the breech, cocking the arm, opening the breech and taking the cartridge from the barrel, a member slidingly mounted on the forestock and a pumping rod connected at its forward end to said sliding member by a joint that is rigid when the rod and sliding member are in line but detachable when the sliding member is turned at an angle by the forward end of the forestock being swung away from the barrel, the rear of said pumping rod being operatively connected to said mechanism in the frame whereby forward and backward movement of the sliding member on the forestock operates said mechanism in the frame.

6. The combination in a rifle having a frame and a barrel, of a breech-block mounted in the frame to move upwardly and forwardly to closed position and downwardly and backwardly to retracted position, a firing-pin slidingly mounted in the breech-block and having a dog projecting therefrom at its rear end, a spring in the breech-block engaging the firing-pin and adapted to be placed under tension as the firing-pin moves rearwardly relative to the breech-block, a locking block pivotally and slidingly mounted in the frame and adapted to move forwardly and upwardly against the bottom of the breech-block when the breech block is in closed position and lock said breech-block in closed position and to move rearwardly and downwardly and unlock said breech-block, a spring-tensioned sear pivotally mounted on said locking block in the path of the dog on the firing-pin and adapted to engage said dog as the breech-block moves forward and put the firing-pin spring under compression and to thereupon move said locking block forwardly and upwardly into locking position beneath the closed breech-block and a trigger pivotally mounted in the frame and having its forward end pivotally and slidingly connected to the rear end of the locking block whereby pulling of the trigger will disengage the sear from the firing-pin, allowing the firing-pin to pass forward and will also remove the forward pressure from the locking block whereby said locking block is free to move rearwardly and downwardly and unlock the breech-block.

7. The combination in a rifle having a frame and a barrel, of a breech-block mounted in the frame to move upwardly and forwardly to closed position and downwardly and backwardly to retracted position, a firing-pin slidingly mounted in the breech-block and having a dog projecting therefrom at its rear end, a spring in the breech-block engaging the firing-pin and adapted to be placed under tension as the firing-pin moves rearwardly relative to the breech-block, a locking block pivotally and slidingly mounted in the frame and adapted to move forwardly and upwardly against the bottom of the breech-block when the breech-block is in closed position and lock said breech-block in closed position and to move rearwardly and downwardly and unlock said breech-block, a spring-tensioned sear pivotally mounted on said locking block in the path of the dog on the firing-pin and adapted to engage said dog as the breech-block moves forward and put the firing-pin spring under compression and to thereupon move said locking block forwardly and upwardly into locking position beneath the closed breech-block, a trigger pivotally mounted in the frame and having its forward end pivotally and slidingly connected to the rear end of the locking block whereby pulling of the trigger will disengage the sear from the firing-pin allowing the firing-pin to pass forward and will also remove the forward pressure from the locking block whereby said locking block is free to move rearwardly and downwardly and unlock the breech-block and a device for releasing said locking block from locking position without pulling the trigger, comprising a member movably mounted in the frame, manually operated from outside the frame and operatively connected to said locking block to withdraw it from locking position.

In testimony whereof I hereunto affix my signature in the presence of two witnesses.

TIMOTHY F. HORAN.

Witnesses:
MARTIN J. CROSBY,
ELEANOR T. DE GIORGI.

Copies of this patent may be obtained for five cents each, by addressing the "Commissioner of Patents, Washington, D. C."